(No Model.)
S. A. BURNS.
BRAKE HANDLE.
No. 500,529. Patented June 27, 1893.
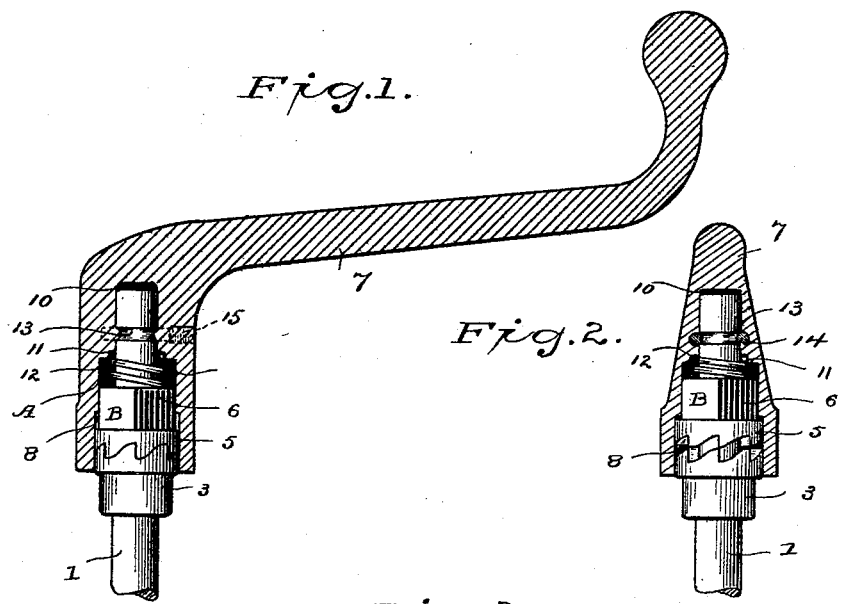
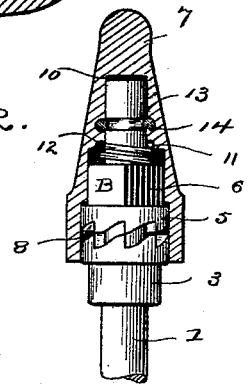
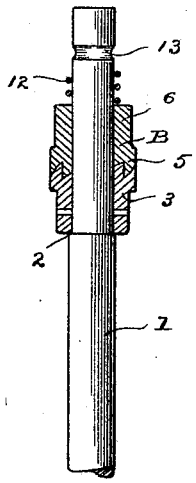
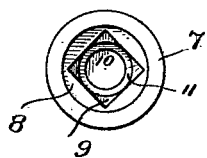
WITNESSES
H. A. Lamb
Mattie R. Davis.
INVENTOR
Samuel A. Burns
By A. M. Wooster
Atty.

UNITED STATES PATENT OFFICE.

SAMUEL A. BURNS, OF BRIDGEPORT, CONNECTICUT.

BRAKE-HANDLE.

SPECIFICATION forming part of Letters Patent No. 500,529, dated June 27, 1893.

Application filed June 23, 1892. Serial No. 437,693. (No model.)

*To all whom it may concern:*

Be it known that I, SAMUEL A. BURNS, a citizen of the United States, residing at Bridgeport, in the county of Fairfield and State of Connecticut, have invented certain new and useful Improvements in Brake-Handles; and I do hereby declare the following to be a full, clear, and exact description of the invention, such as will enable others skilled in the art to which it appertains to make and use the same.

My invention relates to the class of brakes in which the handle when turned in one direction, i. e. forward, rotates the brake staff and when turned backward moves independently of and without turning the brake staff, this class of brake handles being especially adapted for use upon street cars; and the object of my invention is to produce means for adjusting the handle upon the brake staff which shall be simple, strong and durable, inexpensive to produce, and practically impossible to get out of repair.

With these ends in view I have devised the simple and novel construction which I will now describe referring by numbers to the accompanying drawings forming part of this specification, in which—

Figure 1 is a view partly in elevation and partly in section, illustrating the construction of my novel mechanism, the parts being in position as when the handle is being turned forward; Fig. 2 a similar view the parts being in position as when the handle is being turned backward; Fig. 3 a view of the upper end of the brake staff, the handle being removed and the clutch members shown in section; Fig. 4 an inverted plan view of the handle, and Fig. 5 is a cross section of the brake staff showing one of the clutch members thereon.

1 denotes the brake staff which is provided with a shoulder 2 upon which the stationary clutch member 3 rests, said clutch member being locked in position by a pin driven through it and through the staff, or by a drive fit. The stationary clutch member is round in cross section and is provided with teeth on its upper face.

4 denotes the movable clutch member through which the brake staff passes and which is free to turn independently of the brake staff. The lower portion of the movable clutch member is round in cross section as at 5, the upper portion being angular in cross section as at 6. The lower face of this member is provided with clutch teeth adapted to engage the clutch teeth of the stationary member.

7 denotes the handle the lower end of which is provided with a socket A, the lower portion of said socket being round in cross section as at 8 to receive the clutch members freely and permit free vertical movement of the upper clutch member. Above portion 8 of the socket is an angular portion 9 which is adapted to receive the angular portion 6 of the movable clutch member and permit vertical movement of said angular portion therein.

10 denotes the upper end of recess A which is made round in cross section and of suitable size to receive the upper end of the brake staff freely.

At the upper end of the angular portion 9 of recess A is a socket 11 which serves as a seat for the upper end of a spring 12, the lower end of which bears upon the upper end of angular portion 6 of the movable clutch member, acting to force said member down into engagement with the stationary clutch member and retain it there. This spring is not essential to the operativeness of the device although I preferably use it in practice. Near the upper end of the brake staff is a circular groove 13.

14 denotes screw pins the threaded portions of which engage the handle as at 15, see Fig. 1, and the unthreaded portions of which engage groove 13 so as to permit the handle to turn freely on the staff but prevent its removal therefrom until the screw pins are taken out.

It is of course well understood that in using brakes of this class it is desirable that the handle be in such position that it may be readily grasped by the driver to enable him to apply the greatest power of the brake as quickly as possible and without unnecessary movement of the handle, and as cars are made of various styles and sizes it is desirable for the convenience of individual drivers as well as to compensate for the stretching of the chain in use that the handle be so constructed that it may be readily adjusted upon the staff at any time.

My present construction gives ease and quickness of adjustment, is inexpensive to produce as no fitting of the parts is required, and is so strong that breakage is practically impossible.

The operation is as follows: The brake is set or locked in the usual manner, that is by turning the handle forward toward the right. To release the brake the handle is forced forward far enough so that the usual foot dog, not shown in the drawings as it forms no portion of my present invention, may be released in the ordinary manner. The handle and staff are then allowed to turn backward together to relieve the pressure of the brake upon the wheels. The adjustment of the handle upon the staff is made by simply moving the handle backward, the brake staff being locked by the foot dog in the usual manner. When this movement takes place the movable clutch member is turned backward by the handle and will rise in socket A against the power of the spring. As soon as the backward movement of the handle ceases, the spring, or gravity if preferred, will cause the movable clutch member to drop down and place the teeth of the two members in engagement as in Fig. 1. It will be seen that no movement of any part is necessary to adjust the handle except the mere turning of the handle backward. For instance should the driver suddenly be required to exert great power upon the brake and the handle be in an inconvenient position for applying the power, he gives the handle a quick movement backward, the brake staff being of course locked by the usual foot dog, and then applies power again by turning the handle forward to tighten the brake.

Having thus described my invention, I claim—

In combination, the brake staff having a cylindrical clutch member secured rigidly thereto, the vertically movable clutch member having a cylindrical lower part and a body portion above the same of a reduced diameter and angular in cross section, the said movable member being about the upper end of the staff, and the handle swiveled to the brake staff and having a socket, the lower end of which is round in cross section and the upper part angular, said parts being of a greater depth respectively than the cylindrical and angular parts of the movable clutch member to permit vertical movement of the same within the handle, substantially as described.

In testimony whereof I affix my signature in presence of two witnesses.

SAMUEL A. BURNS.

Witnesses:
W. F. BURNS,
M. C. WHITE.